(12) United States Patent
Hoek

(10) Patent No.: US 10,673,499 B2
(45) Date of Patent: Jun. 2, 2020

(54) APPARATUS, METHOD, CENTRAL UNIT AND COMPUTER PROGRAM FOR DETERMINING PRECODING INFORMATION

(71) Applicant: ALCATEL LUCENT, Boulogne-Billancourt (FR)

(72) Inventor: Cornelis Hoek, Stuttgart (DE)

(73) Assignee: ALCATEL LUCENT, Boulogne-Billancourt (FR)

( * ) Notice: Subject to any disclaimer, the term of this patent is extended or adjusted under 35 U.S.C. 154(b) by 2 days.

(21) Appl. No.: 16/307,018

(22) PCT Filed: May 24, 2017

(86) PCT No.: PCT/EP2017/062578
§ 371 (c)(1),
(2) Date: Dec. 4, 2018

(87) PCT Pub. No.: WO2017/211590
PCT Pub. Date: Dec. 14, 2017

(65) Prior Publication Data
US 2019/0222271 A1    Jul. 18, 2019

(30) Foreign Application Priority Data

Jun. 6, 2016 (EP) .................................... 16305656

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0617* (2013.01); *H04B 7/15528* (2013.01); *H04W 88/085* (2013.01); *H04B 7/155* (2013.01)

(58) Field of Classification Search
CPC .................................................... H04B 7/0456
(Continued)

(56) References Cited

U.S. PATENT DOCUMENTS

2012/0300654 A1    11/2012  Gan et al.
2013/0250875 A1*    9/2013  Chen .................. H04W 52/365
                                                    370/329
(Continued)

OTHER PUBLICATIONS

International Search Report and Written Opinion dated Jul. 20, 2017 corresponding to International Patent Application No. PCT/EP2017/062578.
(Continued)

*Primary Examiner* — Peter G Solinsky
(74) *Attorney, Agent, or Firm* — Squire Patton Boggs (US) LLP

(57) ABSTRACT

Embodiments provide an apparatus, a method, a central unit and a computer program for determining information related to precoding. A mobile communication system (300) comprises one or more relay station transceivers (100) being configured, to provide wireless services to one or more mobile transceivers (200) of the mobile communication system (300) via a first radio channel. The one or more relay station transceivers (100) are configured to use wireless backhaul communication to communicate with a central, unit (400) of the mobile communication system (300) via a second radio channel. An apparatus (10) for determining information related to precoding in the mobile communication system (300) comprises one or more interfaces (12) configured to obtain, information related to the first radio channel or an. effective access channel, and to obtain information related to the second radio channel. The apparatus (10) further comprises a control module (14) configured to determine the information related to the precoding based on the information related to the first radio channel or the
(Continued)

effective access channel, and based on the information related to the second radio channel.

20 Claims, 6 Drawing Sheets

(51) Int. Cl.
    *H04B 7/155*     (2006.01)
    *H04W 88/08*     (2009.01)

(58) Field of Classification Search
    USPC .......................................................... 370/329
    See application file for complete search history.

(56) References Cited

U.S. PATENT DOCUMENTS

2014/0307702 A1     10/2014   Mese et al.
2019/0007996 A1*   1/2019   Boudreau ............ H04B 7/0626

OTHER PUBLICATIONS

Jan. 23, 2019 Office Action issued in European Patent Application No. 16305656.7.

\* cited by examiner

APPARATUS, METHOD, CENTRAL UNIT AND COMPUTER PROGRAM FOR DETERMINING PRECODING INFORMATION

TECHNICAL FIELD

Embodiments relate to an apparatus, a method, a central unit and a computer program for determining precoding information, more particularly, but not exclusively to a concept of using cooperative multipoint transmission and beamforming in a mobile communication system comprising two wireless links, one between a mobile transceiver and a relay station transceiver and another one between the relay station transceiver and a central unit of the mobile communication system.

BACKGROUND

This section introduces aspects that may be helpful in facilitating a better understanding of the invention(s). Accordingly, the statements of this section are to be read in this light and are not to be understood as admissions about what is in the prior art or what is not in the prior art.

With the increasing demand for data services, wireless systems tend to use more and more bandwidth and higher carrier frequencies. For example, Fifth Generation (5G) wireless access may be expected to embrace mm-Wave frequencies to provide multi-Gbps data rates, typically in femto, pico, or metro cell type of deployments. With deployment of a higher number of small cells costs for backhaul infrastructure are growing. Using wireless backhauls may reduce the costs but introduces further complexity and processing for the wireless backhaul links.

Some solutions use wired backhauls (e.g. coax or optical cables) for transferring the data of small cells to a central unit. In some scenarios a wired backhaul is not desired or not possible. In this case alternatives are wireless backhaul methods like mm-wave backhauls with multiple min-wave links or massive MIMO (Multiple-input-Multiple-Output) backhauls, where with the help of an array antenna multiple beams are transmitted to the individual small cells.

A wireless backhaul may introduce cross interference between the multiple radio links that use the same radio resources, which is reduced as much as possible using antenna arrays with a high number of antennas and corresponding complex processing. It is tried to reduce this cross interference as much as possible by increasing the directivity of the radio links, e.g. by increasing the antenna size of the mm-wave links or by increasing the number of antennas of the massive MIMO array antenna. It is desired to make the quality of the massive MIMO backhaul links good enough such that backhaul impairments do not significantly reduce the quality of the wireless access link.

As a result the effort for the massive MIMO wireless backhaul is high in order to reduce the cross interference of multiple backhaul links. A large number of antenna elements may be used, precise channel state information may be required and computational expensive beamforming algorithms (e.g. Zero Forcing (ZF)) are used. In some solutions, where analog RX-TX (Receive-Transmit) data of wireless cells are transported with a massive MIMO backhaul solution to a central unit that handles the data of multiple small cells, the cross interference of the backhaul link can reduce the quality of the wireless access links.

Document US 2014/0307702 A1 discloses a concept for a mobile communication system with a wireless backhaul using massive MIMO. Document US 2012/0300654 A1 describes a concept for channel estimation in a relaying scenario.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the invention(s). Detailed descriptions of a preferred exemplary embodiment adequate to allow those of ordinary skill in the art to make and use the inventive concepts will follow in later sections.

Various embodiments provide an apparatus, a method, a central unit and a computer program for determining precoding information. Embodiments are based on the finding that in a scenario with a wireless backhaul, both wireless links can be considered together and jointly processed. Cross interference on the backhaul link can then be allowed to a certain extent, as an overall processing between the mobiles and the central unit across both wireless channels can be used to reduce the interference experienced at the mobiles.

Embodiments provide an apparatus for determining information related to precoding in a mobile communication system. The mobile communication system comprises one or more relay station transceivers being configured to provide wireless services to one or more mobile transceivers of the mobile communication system via a first radio channel. The one or more relay station transceivers are configured to use wireless backhaul communication to communicate with a central unit of the mobile communication system via a second radio channel. The apparatus comprises one or more interfaces configured to obtain information related to the first radio channel or an effective access channel, and to obtain information related to the second radio channel. The apparatus further comprises a control module configured to determine the information related to the precoding based on the information related to the first radio channel or the effective access channel, and based on the information related to the second radio channel. Embodiments take both wireless channels into account which may allow for less complex processing for the backhaul.

In some embodiments the information related to the first radio channel and the information related to the second radio channel is estimated together as an estimated effective access channel, comprising the first radio channel, the second radio channel and backhaul precoding. The information related to the first radio channel or the information related to the effective access channel may be estimated at the one or more mobile transceivers. The information related to the second radio channel may be estimated at the one or more relay station transceivers. Such channel estimation information may then be provided to the control module, which bases an overall channel estimation, e.g. of the effective access channel and/or the calculation of the precoding thereon. In embodiments the mobile communication system may comprise two or more relay station transceivers and the information related to the precoding comprises information related to a cooperative multipoint transmission from the two or more relay station transceivers to the one or more mobile transceivers. Embodiments may provide increased performance by using cooperative multipoint transmission from multiple relay station transceivers to multiple mobile transceivers. The information related to the precoding may comprise beamforming information related to the second radio channel. Embodiments may use beamforming and cooperative multipoint transmission. In some embodiments the control module may be configured to determine the information related to precoding allowing cross-interference between the two or more relay station transceivers. The cross-interference may at least partly be compensated for by cooperative multipoint transmission from the two or more relay station transceivers to the one or more mobile transceivers.

In further embodiments the control module may be configured to determine the information related to the precoding based on conjugate beamforming on the second radio channel. The one or more relay station transceivers may comprise a plurality of antennas and the information related to the first radio channel or the effective access channel may comprise information related to an estimated Multiple-Input-Multiple-Output radio channel between the one or more relay station transceivers and the one or more mobile transceivers. The central unit may comprise a plurality of antennas and the one or more relay station transceivers may comprise a plurality of antennas. The information related to the second radio channel may also comprise information related to an estimated Multiple-Input-Multiple-Output radio channel between the central unit and the one or more relay station transceivers.

In some embodiments the information related to the first radio channel or the effective access channel comprises information related to an access radio channel matrix and the information related to the second radio channel comprises information related to a backhaul channel matrix. The information related to the precoding comprises information related to a backhaul precoding matrix and information related to a modified access precoding matrix. In some further embodiments the control module may be further configured to apply the backhaul precoding matrix before backhaul transmission and the control module may be configured to apply the modified access precoding matrix before applying the backhaul precoding matrix. An overall precoding improvement may be achieved by embodiments by taking the combined channel information into account. In some embodiments the precoding is applied at the central unit of the mobile communication system. Signal processing may then be carried out in a central manner in at least some embodiments.

Embodiments further provide a central unit of a mobile communication system comprising the above described apparatus. Embodiments further provide a method for determining information related to precoding in a mobile communication system. The mobile communication system comprises one or more relay station transceivers being configured to provide wireless services to one or more mobile transceivers of the mobile communication system via a first radio channel. The one or more relay station transceivers are configured to use wireless backhaul communication to communicate with a central unit of the mobile communication system via a second radio channel. The method comprises obtaining information related to the first radio channel or the effective access channel, and obtaining information related to the second radio channel. The method further comprises determining the information related to the precoding based on the information related to the first radio channel or the effective access channel, and based on the information related to the second radio channel.

Embodiments further provide a computer program having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

BRIEF DESCRIPTION OF THE FIGURES

Some other features or aspects will be described using the following non-limiting embodiments of apparatuses or methods or computer programs or computer program products by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. Ii will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
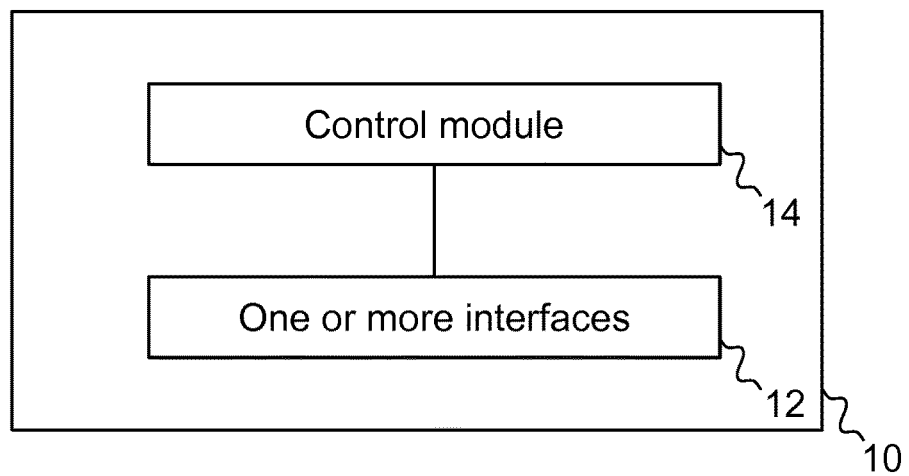
FIG. 1 illustrates an embodiment of an apparatus for determining information related to precoding.
Figure 1:
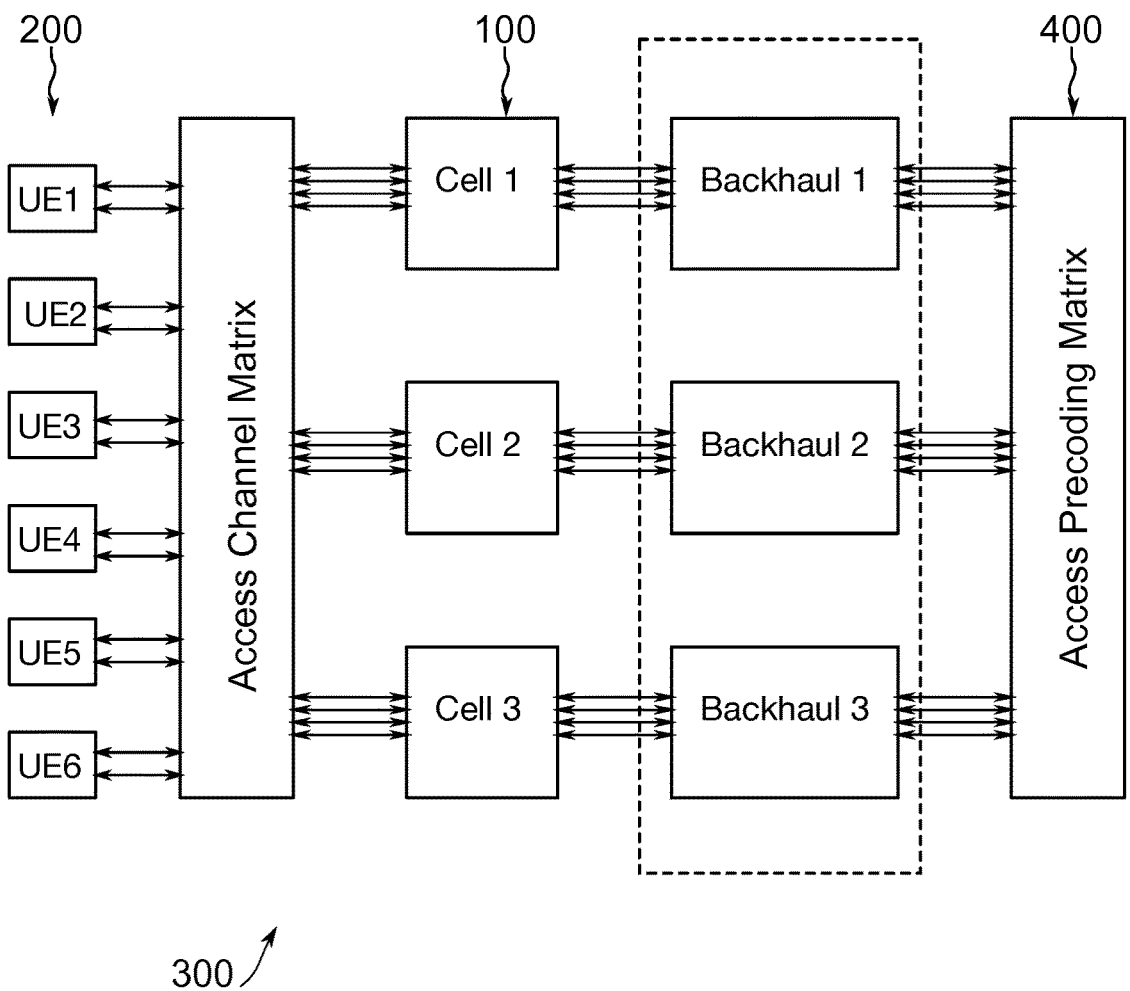

FIG. 1 illustrates an embodiment of an apparatus 10 for determining information related to precoding in a mobile communication system 300. The mobile communication system 300 comprises one or more relay station transceivers 100, which are configured to provide wireless services to one or more mobile transceivers 200 of the mobile communication system 300 via a first radio channel. The one or more relay station transceivers 100 are configured to use wireless backhaul communication to communicate with a central unit 400 of the mobile communication system 300 via a second radio channel.

The mobile communication system 300 may, for example, correspond to one of the Third Generation Partnership Project (3GPP)-standardized mobile communication networks, where the term mobile communication system 300 is used synonymously to mobile communication network. The mobile or wireless communication system 300 may correspond to a mobile communication system of the 5th Generation (5G) and may use mm-Wave technology. The mobile communication system 300 may correspond to or comprise, for example, a Long-Term. Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Interoperability for Microwave Access (WIMAX) network IEEE 802.16 or Wireless Local Area Network (WLAN) IEEE 802.11, generally an Orthogonal Frequency Division Multiple Access (OFDMA) network, a Time Division. Multiple Access (TDMA) network, a Code Division Multiple Access (CDMA) network, a Wideband-CDMA (WCDMA) network, a Frequency Division Multiple Access (TDMA) network, a Spatial Division Multiple Access (SDMA) network, etc.

A base station transceiver 100 can be operable to communicate with one or more active mobile transceivers 200 and a base station transceiver 100 can be located in or adjacent to a coverage area of another base station transceiver, e.g. a macro cell base station transceiver or small cell base station transceiver. Hence, embodiments may provide a mobile communication system 400 comprising one or more mobile transceivers 200 and one or more base station transceivers 100, wherein the base station transceivers 100 may establish macro cells or small cells, as e.g. pico-, metro-, or femto cells. A mobile transceiver 200 may correspond to a smartphone, a cell phone, user equipment, a laptop, a notebook, a personal computer, a Personal Digital Assistant (PDA), a Universal Serial Bus (USB)-stick, a car, etc. A mobile transceiver 200 may also be referred to as User Equipment (UE) or mobile in line with the 3GPP terminology.

A base station transceiver 100 can be located in the fixed or stationary part of the network or system. A base station transceiver 100 may correspond to a remote radio head, a transmission point, an access point, a macro cell, a small cell, a micro cell, a femto cell, a metro cell etc. A base station transceiver 100 can be a wireless interface of a wired network, which enables transmission of radio signals to a UE or mobile transceiver 200. Such a radio signal may comply with radio signals as, for example, standardized by 3GPP or, generally, in line with one or more of the above listed systems. Thus, a base station transceiver 100 may correspond to a NodeB, an eNodeB, a Base Transceiver Station (BTS), an access point, a remote radio head, a relay station, a transmission point etc., which may be further subdivided in a remote unit and a central unit 400.

A mobile transceiver 200 can be associated with a base station transceiver 100 or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

In other words, in embodiments the mobile communication system may correspond to a HetNet, which utilizes different cell types, i.e. Closed Subscriber Group (CSG) cells and open cells, and cells of different sizes, as, for example, macro cells and small cells, where the coverage area of a small cell is smaller than the coverage area of a macro cell. A small cell may correspond to a metro cell, a micro cell, a pico cell, a femto cell, etc. Such cells are established by base station transceivers for which their coverage areas are determined by their transmission power and interference condition. In some embodiments a small cell's coverage area can at least partly be surrounded by the coverage area of a macro cell established by another base station transceiver. The small cells can be deployed to extend the capacity of the network. A metro cell may therefore be used to cover a smaller area than a macro cell, e.g. a metro cell may cover a street or a section in a metropolitan area. For a macro cell the coverage area may have a diameter in the order of one or more kilometers, for a micro cell the coverage area may have a diameter below a kilometer, and for a pica cell the coverage area may have a diameter below a 100 m. A femto cell may be the smallest cell and it may be used to cover a household or gate section at the airport, i.e. its coverage area may have a diameter below 50 m. Thus, a base station transceiver may also be referred to as cell.

As shown in FIG. 1 the apparatus 10 comprises one or more interfaces 12 configured to obtain information related to the first radio channel or an effective access channel and to obtain information related to the second radio channel. An interface 12 may be a connector, a pin, a plug, a register, etc.

that is configured to provide and/or to determine signals from other network components. In some embodiments the one or more interfaces 12 may be configured to provide and/or determine analog or digital signals, signals of a transmission band, an intermediate band, or in the base band. Between the one or more interfaces 12 and the other components there may be intermediate links, wired or wireless connections, interfaces, etc. The one or more interfaces are configured or adapted such that corresponding information or signaling can be exchanged between the apparatus 10 and the respective other network components.

The apparatus 10 further comprises a control module 14, which is coupled to the one or more interfaces 12. The control module 14 is configured to control the one or more interfaces 12 and to determine the information related to the precoding based on the information related to the first radio channel or the effective access channel, and based on the information related to the second radio channel. In embodiments the control module 14 may be implemented using one or more processing units, one or more processing devices, any means for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

In embodiments mobile transceivers 200, relay station transceivers 100 and central units 400 may utilize a plurality of antennas. These components may comprise correspondingly configured transceiver modules, which are directly or indirectly coupled to the respective antennas and/or antenna elements. Such a transceiver module may comprise typical transceiver components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The antennas may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field, a field array, combinations thereof, etc.

Signals transmitted to and/or received from the antennas can be phase shifted versions of each other. Depending on the geometry of the antennas directions of constructive and destructive superposition can be generated making up the beams. For example, analog phase shifters or a Butler matrix may be used with preset or configurable phase relations to generate a grid of beams. In embodiments digital beamforming may be used such that the phases of the signal are manipulated digitally, e.g. in the base band. A digital beamformer may use a multiplication of complex signals with complex numbers: phase and amplitude of a signal may be varied. For example, a Discrete Fourier Transformation (DFT) may be used to form a grid to select beams from. Signals in the antennas paths are then multiplied with DFT coefficients, e.g. with $\exp(j\, 2\, \pi\, m\, k/M)$, in which M is the number of antennas, m is the beam index and k is the antenna element index, further assuming a linear array of antennas.

In embodiments beamforming can be used to form a grid, which may correspond to a set of beams, which may be uniform or non-uniform, they may differ in their shape and direction. For example, a codebook comprising a number of precoding vectors may be defined and a precoding vector may generate a beam, which can have any shape. From a code book a set of precoding vectors can be selected. The beams may differ in their directions and shapes. Such a selection or generation of beams may depend on the actual network situation, whether spatial nulling or spatial interference reduction/cancellation is applied, the characteristic of the deployment scenario, whether there is line-of-sight or non-line-of-sight propagation, how many mobile/relay station transceivers are to be served, how many antennas elements are available, etc.

As further shown in FIG. 1 the apparatus 10 also comprises a control module 14, which is configured to control the one or more interfaces 12, the transceiver module, respectively. In the embodiment shown in FIG. 1 the control module 14 is coupled to the one or more interfaces 12. The control module 14 may be implemented as or correspond to one or more control units, one or more control modules, one or more control devices, any means for controlling, etc. In some embodiments the control module may be implemented as a programmable hardware component such as a processor, a Digital Signal Processor (DSP), a general purpose processor, or any other programmable hardware. In some embodiments the control module 14 may therefore at least partly correspond to software, which is adapted to be executed on an accordingly adapted programmable hardware component.

FIG. 1 illustrates an embodiment of the apparatus 10 at the top and a network scenario with multiple UEs 200, multiple cells or Remote Radio Heads (RRH, relay station transceivers, base station transceiver with wireless backhaul, etc.) 100 and a central unit 400 at the bottom. For example, downlink data transmission is considered. The information related to the first radio channel and the information related to the second radio channel may be estimated together as an estimated effective access channel, comprising the first radio channel, the second radio channel and backhaul precoding. In some embodiments the information related to the first radio channel or the effective access channel may be estimated at the one or more mobile transceivers 200. The information related to the second radio channel may be estimated at the one or more relay station transceivers. In further embodiments other variants of channel estimation and in particular how and from where it is carried out are conceivable. Furthermore, uplink transmission can be possible.

As shown in FIG. 1 the mobile communication system 300 comprises two or more relay station transceivers 100, exemplified as cells Cell 1, Cell 2, and Cell 3. The information related to the precoding comprises information related to a cooperative multipoint transmission from the two or more relay station transceivers 100 to the one or more mobile transceivers 200. In a further embodiment the information related to the precoding comprises beamforming information related to the second radio channel, which applies if the backhaul link comprises a radio channel component as well. This is indicated by the broken line box in FIG. 1, which indicates that the backhauls, Backhaul 1, Backhaul 2, and Backhaul 3 can be coupled, e.g. in case of radio links there is cross interference between the backhaul links. If a CPRI link is used on the backhaul then there is no second radio channel. The control module 14 is configured to determine the information related to precoding such that some cross-interference is allowed between the two or more relay station transceivers. The cross-interference is at least partly compensated by cooperative multipoint transmission from the two or more relay station transceivers 100 to the one or more mobile transceivers 200.

In some embodiments concepts of CoMP (Coordinated Multi Point) and massive MIMO can be combined. The effort of the massive MIMO backhaul system may be reduced by using less antenna elements and computationally cheap beamforming algorithms like conjugate beamforming that do not require very accurate channel information. The control module 14 is then configured to determine the information related to the precoding based on conjugate beamforming on the second radio channel. The resulting high (or higher compared to massive MIMO) cross-interference of the backhaul link is accepted in an embodiment as part of the effective wireless channel. A CoMP system is built with the small cells and the effective wireless channel is used for calculating an Access Precoding Matrix, which is applied in the embodiment shown in FIG. 1 at the central unit 400. In other words in the present embodiment the apparatus 10 may be comprised in, located at, or collocated with the central unit 400. In other embodiments the apparatus 10 may as well be comprised in, located at, or collocated with other network components such as, for example, the RRHs (RH1, RRH2, RRH3 in FIG. 1) or another component, potentially also one that isn't shown in FIG. 1.

Since cross interference is allowed to some extent in embodiments it might not significantly reduce the system performance for as long as it is considered in the precoding. Embodiments may allow backhaul solutions with much lower specs, lower effort and lower implementation cost, due to the possibility of compensating for the cross interference in the subsequent processing. The multiple cells may form a CoMP system in embodiments that may improve the total throughput in comparison with a solution without joint processing between cells.

Figure 2:
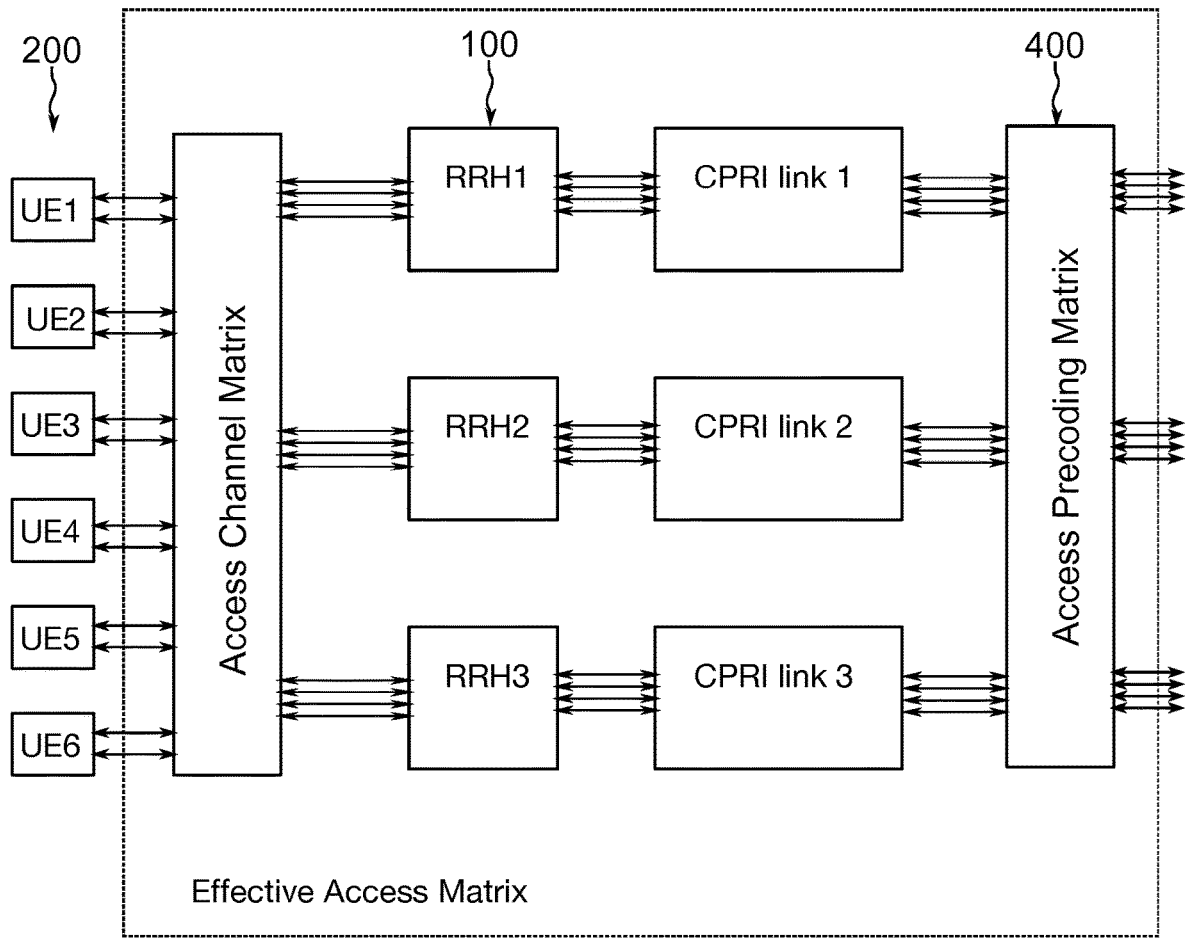
FIG. 2 illustrates a COMP system for cells.

FIG. 2 illustrates a CoMP system for cells. In FIG. 2 a system 300 is shown with three cells handled by three RRHs: RRH1, RRH2, and RRH3, with a Common Public Radio Interface (CPRI): CPRI link 1, CPRI link 2, CPRI link 3, backhaul. The access channel matrix is based on the first radio channel. If the backhaul link is a radio link as well, the access precoding matrix is also based on the second radio channel. The access channel matrix and the access precoding matrix form an effective access matrix together, which is indicated by the broken line box in FIG. 2. Various CoMP algorithms can be used for calculating the access precoding matrix.

Figure 3:
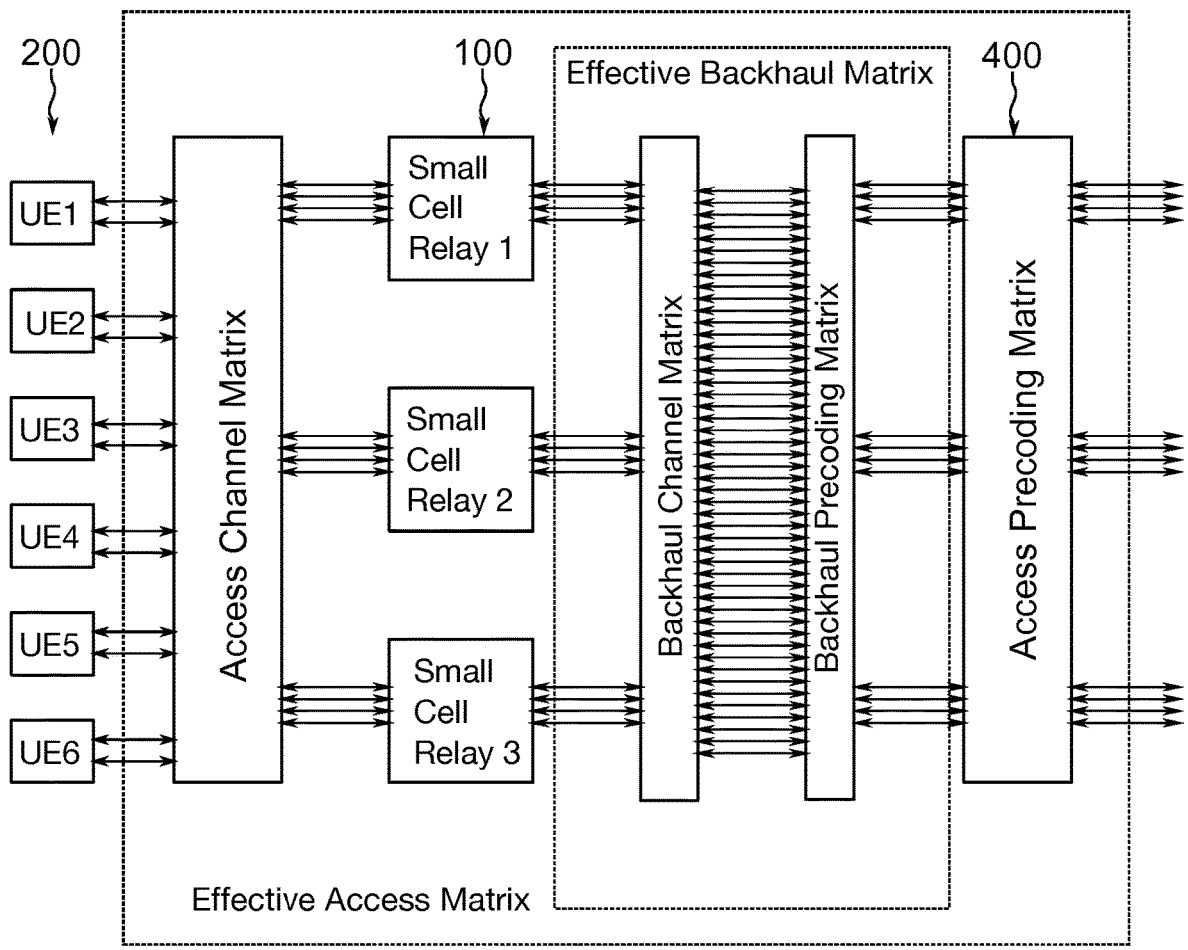
FIG. 3 illustrates a network MIMO system for three small cells with a massive MIMO backhaul.

If backhaul options with wireline (optical or copper) connections are not feasible then wireless backhauls can be used with massive MIMO on the backhaul link. For the backhaul link a massive MIMO concept may utilize many antennas in order to achieve an effective backhaul matrix (backhaul channel×backhaul precoding matrix) that is close to a diagonal matrix. FIG. 3 illustrates a network MIMO system for three small cells with a massive MIMO backhaul. The concept is illustrated in FIG. 3 with the help of the denser transmission arrows between the backhaul precoding matrix and backhaul channel matrix. Massive MIMO may generate a high effort for backhaul transmission as an effective backhaul matrix close to a diagonal matrix may be determined. The effective access matrix may remain almost unchanged with respect to a RRH solution. In such a concept a very high fraction of the signals on the backhaul links may arrive at the intended antennas and only a very small fraction may be received as interference by other antennas. This may be achieved by using a comparatively complex massive MIMO backhaul system with many antennas and computationally advanced beamforming algorithms.

Figure 4:
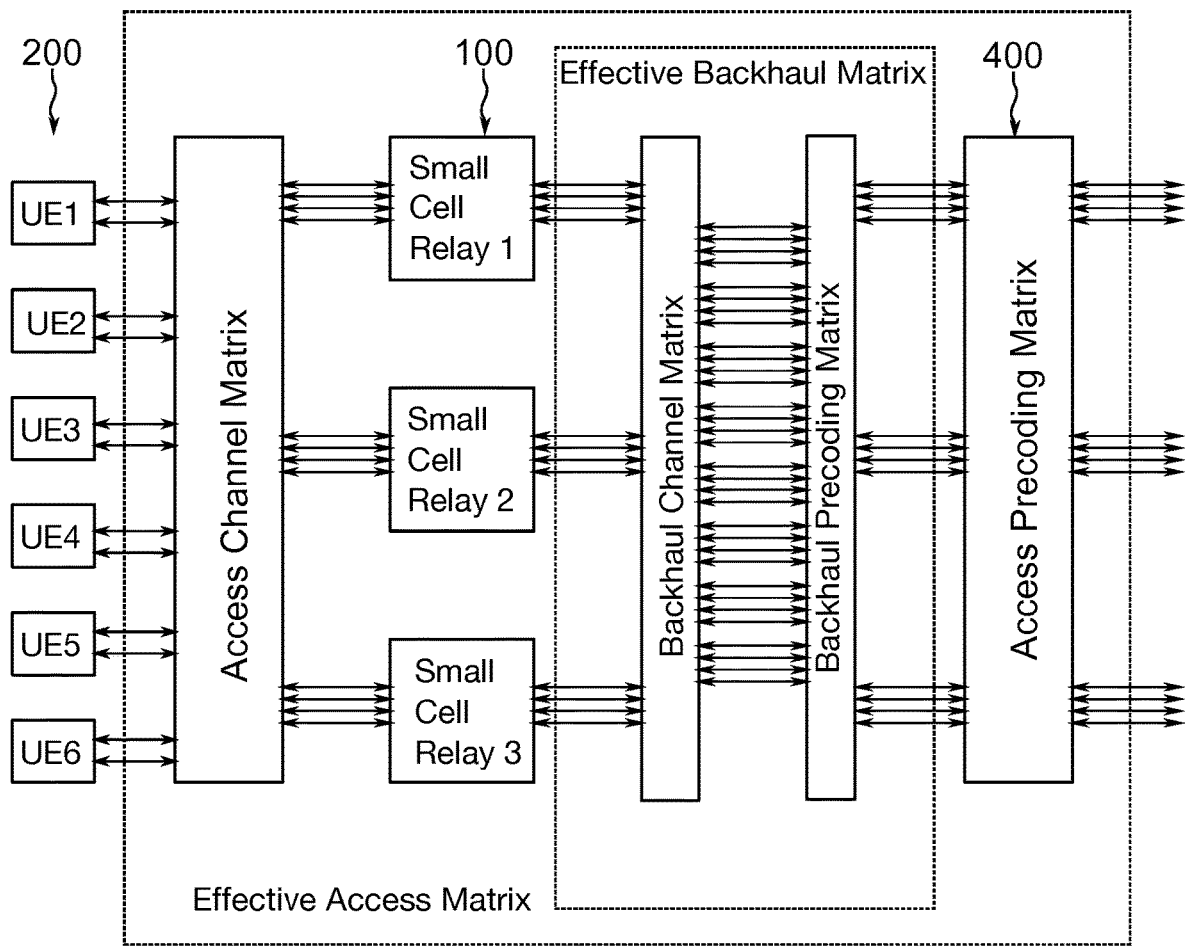
FIG. 4 shows another network MIMO system for three small cells with a massive MIMO backhaul in an embodiment.

FIG. 4 shows another network MIMO system for three small cells with massive MIMO backhaul in an embodiment. In FIG. 4 the effort for the massive MIMO backhaul is considerably reduced by using less antennas and more simple algorithms that require only moderate precision of the Channel State Information (CSI) of the backhaul channel, e.g. using conjugate beamforming algorithms instead of zero forcing algorithms. In this embodiment the control module 14 is configured to determine the information related to the precoding based on conjugate beamforming on the second radio channel.

As a result the effective backhaul matrix is not diagonal any more but has large non-diagonal (cross interference) elements that are only ~10 dB smaller than the diagonal elements. The effective access matrix is not optimal since the access precoding matrix does not correct for the non-perfect backhaul and it is computed based on the first radio channel only. In the scenario depicted in FIG. 4 low processing effort is spent for backhaul, as a consequence the effective backhaul matrix has larger non-diagonal entries and the effective access matrix has changed due to non-perfect backhaul as compared to the scenario depicted in FIG. 3.

Figure 5:
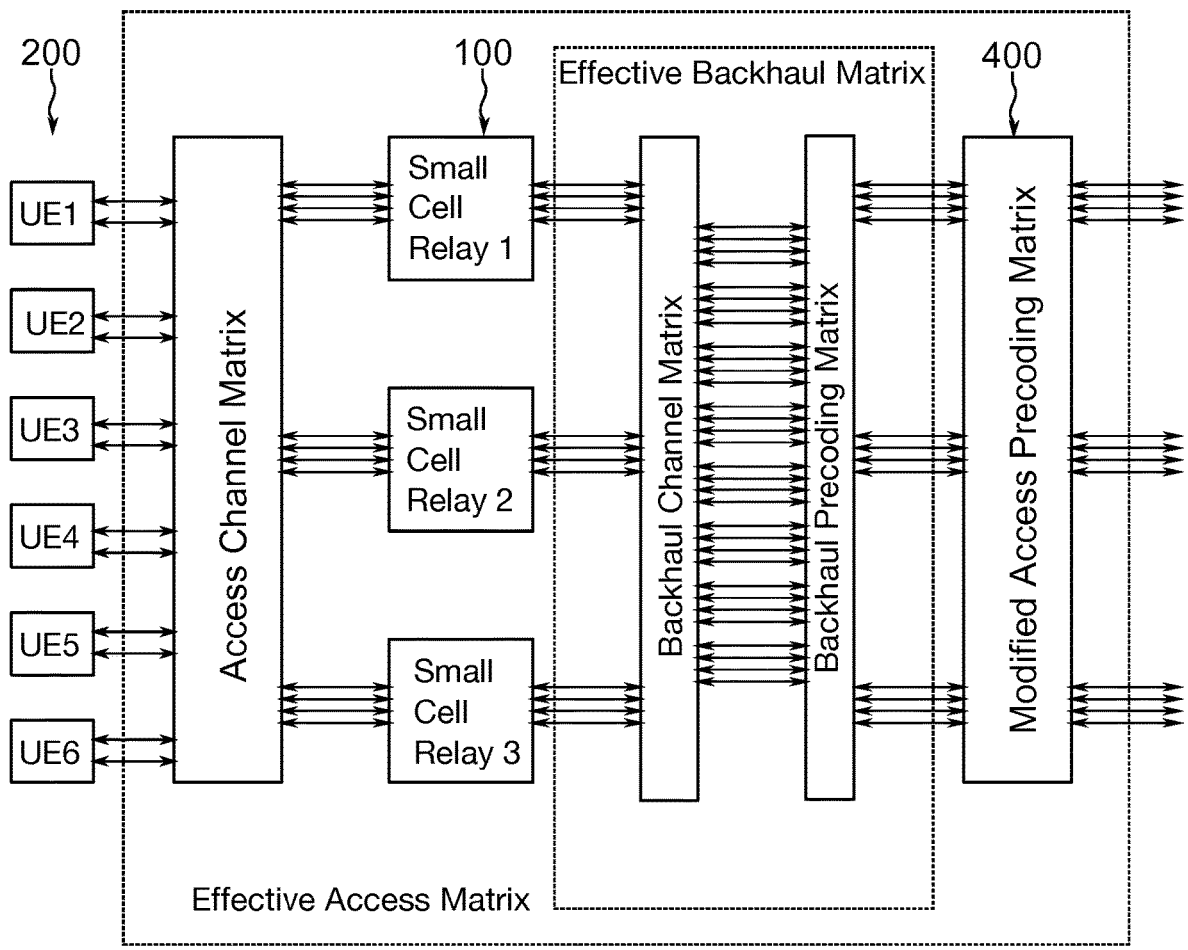
FIG. 5 shows another network MIMO system for three small cells with a massive MIMO backhaul in an embodiment.

FIG. 5 shows another network MIMO system for three small cells with massive MIMO backhaul in an embodiment. In this embodiment the one or more relay station transceivers 100 comprise a plurality of antennas and the information related to the first radio channel or the effective access channel comprises information related to an estimated MIMO radio channel between the one or more relay station transceivers 100 and the one or more mobile transceivers 200. The central unit 00 also comprises a plurality of antennas and the information related to the second radio channel comprises information related to an estimated MIMO radio channel between the central unit 400 and the one or more relay station transceivers 100. The information related to the first radio channel comprises information related to an access radio channel matrix and the information related to the second radio channel comprises information related to a backhaul channel matrix. The information related to the precoding comprises information related to a backhaul precoding matrix and information related to a modified access precoding matrix. The control module 14 is further configured to apply the backhaul precoding matrix before backhaul transmission and the control module 14 is configured to apply the modified access precoding matrix before applying the backhaul precoding matrix. For the downlink the precoding is applied at the central unit 400 of the mobile communication system 300. FIG. 5 also illustrates an embodiment of a central unit 400 of a mobile communication system 300 comprising the apparatus 10 according to the above description.

In FIG. 5 such an embodiment is illustrated. Again a reduced complexity backhaul is used but now the imperfect effective backhaul matrix is multiplied with the access channel matrix for obtaining a final channel matrix that is used for computing the modified access precoding matrix. Since the cross-interference of the non-perfect backhaul is corrected in the modified access precoding matrix no or a reduced degradation of the CoMP system occurs. In the embodiment low effort is spent on backhaul processing and the effective backhaul matrix has larger non-diagonal entries. The embodiment uses a modified access precoding matrix, which corrects for the effective channel. The effective channel=access channel×effective backhaul channel.

For channel estimation pilot symbols may be inserted in the corresponding signals. Regarding the downlink backhaul channel matrix estimation, such symbols may be inserted at the central unit 400. The downlink backhaul channel matrix can be measured by inserting dedicated pilots, for example, on each of 32 TX antennas. The 32 TX antennas are an example for the configuration of the massive MIMO system shown in FIG. 5. Insertion could be done by frequency, time, code, and/or spatial resources, i.e. according to any pilot grid, potentially having time, frequency, code and spatial dimensions. Pilot symbols could be inserted in a frequency/time/code/spatial multiplex or in a combination of these methods.

Each small cell may then estimate the [32×4] channel of all 32 TX antennas of the massive MIMO array to its four (example) DL RX antennas by evaluating the received pilots and may transmit the information back to the control module 14 using uplink resources after optional compression. The four RX antennas are again an example. The control module 14 may then use the reported information of the three small cells for assembling the complete [32×12] backhaul channel matrix. As an alternative in a Frequency Division. Duplex (FDD) system the small cells could loop back the received pilot signals in the uplink at regular time intervals and the control unit 14 could extract both the downlink backhaul channel matrix and the uplink backhaul channel matrix from the received information.

Using the obtained downlink backhaul channel matrix the control unit 14 can calculate the downlink backhaul precoding matrix using a suitable beamforming algorithm, for example the conjugate beamformer algorithm or the zero-forming algorithm. The downlink backhaul precoding matrix may then make sure that the signals that are intended for a certain UE arrive mainly at the small cell relay that has the best channel to this UE. Therefore a large percentage of the TX power of this small cell relay is used for the downlink signals that are intended for its connected UE's and only a small percentage of the TX power is used for transmission of signals that are intended for UE's that are connected to other small cells.

The effective downlink access channel matrix may represent the channel between the 12 inputs (example) of the downlink backhaul precoding matrix and the 12 RX UE antennas (matrix multiplication of downlink access channel matrix and effective downlink backhaul matrix). The control unit 14 may insert pilot symbols on each of the 12 inputs of the backhaul precoding matrix. Again such insertion could be a grid of one or more dimensions, e.g. frequency, time, code, spatial, etc. multiplex or a combination of these methods. Each UE 200 may estimate the [12×2] channel of all 12 inputs of the downlink backhaul precoding matrix to its two DL RX antennas by evaluating the received pilots and may transmit the information back using uplink resources to the control module 14. The control module 14 may use the reported information of the 6 UE's 200 for assembling the complete [12×12] backhaul channel matrix. Using the obtained downlink access channel matrix the control unit 14 may calculate the modified access precoding matrix, e.g. using the zero forcing algorithm.

Additionally or alternatively, the downlink access channel may be estimated. The measuring of the downlink access channel may require inserting of pilots symbols in the signals that are transmitted by the relay station 100. This may have two disadvantages. First, the relay station 200 may have to modify the received signal before transmission and signal processing at the relay station transceiver 200 is not transparent. Secondly, for calculating the effective downlink access channel matrix, a multiplication of the downlink access channel matrix with the downlink backhaul matrix and the downlink precoding matrix may have to be evaluated. For the downlink backhaul matrix there may be a more or less precise estimate. The estimate of the above method may include the real backhaul channel and does not require modification of the relayed downlink signal.

In the uplink direction the situation may be less complicated. The small cells 100 may relay the received uplink signals. The UE's 200 that are connected to the small cells 100 may have (on average) a better channel to a serving small cell. Thus a large portion of Uplink RX power and the Uplink TX power of a small cell relay 100 may be related to the uplink signals of the mobiles that are allocated to it. The UV's 200 may insert pilot symbols on their uplink TX signals. Insertion could again be based on frequency, time, code and/or spatial multiplex or a combination of these methods. The control unit 14 may receive the 12 TX signals of the 6 UE's 200 on 32 RX antennas of the Massive MIMO array. From the pilots it may calculate the [12×32] uplink channel matrix. The channel matrix may represent the matrix multiplication of uplink access channel matrix and uplink backhaul channel matrix. In some embodiments there might not be a need for calculating an individual uplink backhaul precoding matrix and a modified uplink precoding matrix, but the control unit 14 may directly calculate a [32×12] beamforming matrix that gives an improved or even optimal separation of the 12 received uplink signals e.g. using the zero forcing algorithm.

Figure 6:
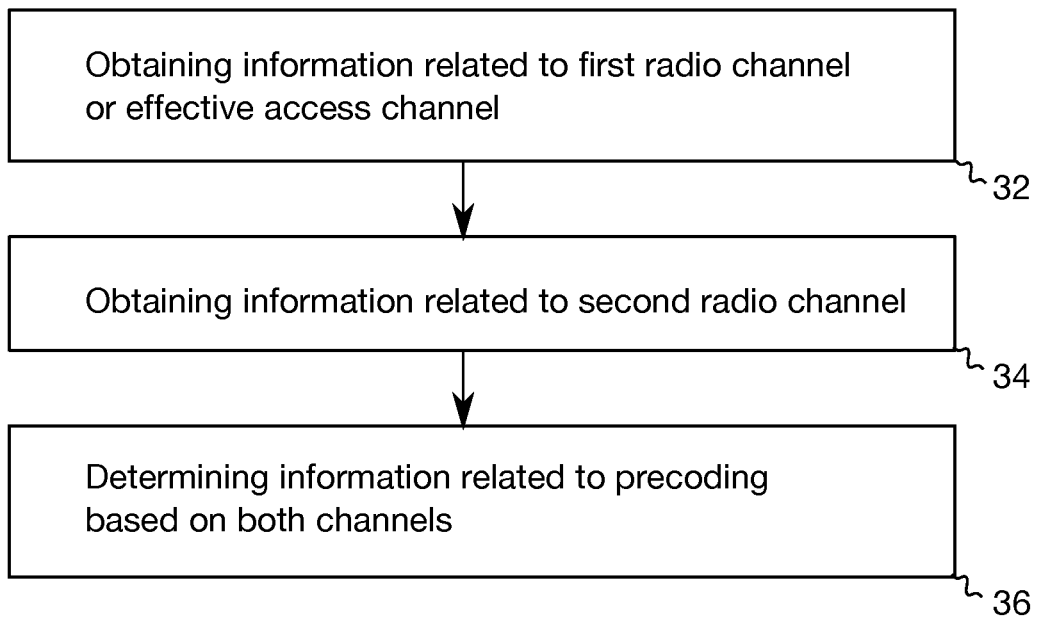
FIG. 6 shows a block diagram of a flow chart of an embodiment of a method for a mobile transceiver.

FIG. 6 shows a block diagram of a flow chart of an embodiment of a method for determining information related to precoding in a mobile communication system 300. The mobile communication system 300 comprises one or more relay station transceivers 100, which are configured to provide wireless services to one or more mobile transceivers 200 of the mobile communication system 300 via a first radio channel. The one or more relay station transceivers 100 are configured to use wireless backhaul communication to communicate with a central unit 400 of the mobile communication system 300 via a second radio channel. The method comprises obtaining 32 information related to the first radio channel or an effective access channel, and obtaining 34 information related to the second radio channel. For example, the first radio channel may be a downlink access channel, and the effective access channel may correspond to a complete or end-to-end channel between a central unit 400 and a UE 200. The method further comprises determining 36 the information related to the precoding based on the information related to the first radio channel or the effective access channel, and based on the information related to the second radio channel.

Another embodiment is a computer program having a program code for performing at least one of the above methods, when the computer program is executed on a computer, a processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

The invention claimed is:

1. An apparatus for determining information related to precoding in a mobile communication system, the mobile communication system comprising one or more relay station transceivers being configured to provide wireless services to one or more mobile transceivers of the mobile communication system via a first radio channel, the one or more relay station transceivers being configured to use wireless backhaul communication to communicate with a central unit of the mobile communication system via a second radio channel, the apparatus comprising:
one or more interfaces configured to obtain information related to the first radio channel or an effective access channel, and to obtain information related to the second radio channel; and
a control module configured to determine the information related to the precoding based on the information related to the first radio channel or the effective access channel, and based on the information related to the second radio channel, wherein the information related to the first radio channel and the information related to the second radio channel is estimated together as an estimated effective access channel, comprising the first radio channel, the second radio channel and backhaul precoding at the one or more mobile transceivers.

2. The apparatus of claim 1, wherein the information related to the second radio channel is estimated at the one or more relay station transceivers.

3. The apparatus of claim 1, wherein the information related to the first radio channel is estimated at the one or more mobile transceivers, or wherein the information related to the second radio channel is estimated at the one or more relay station transceivers.

4. The apparatus of claim 1, wherein the mobile communication system comprises two or more relay station transceivers and wherein the information related to the precoding comprises information related to a cooperative multipoint transmission from the two or more relay station transceivers to the one or more mobile transceivers.

5. The apparatus of claim 4, wherein the information related to the precoding comprises beamforming information related to the second radio channel.

6. The apparatus of claim 4, wherein the control module is configured to determine the information related to precoding allowing cross-interference between the two or more relay station transceivers, which is at least partly compensated by cooperative multipoint transmission from the two or more relay station transceivers to the one or more mobile transceivers.

7. The apparatus of claim 1, wherein the control module is configured to determine the information related to the precoding based on conjugate beamforming on the second radio channel.

8. The apparatus of claim 1, wherein the one or more relay station transceivers comprise a plurality of antennas and wherein the information related to the first radio channel or the effective access channel comprises information related to an estimated Multiple-Input-Multiple-Output radio channel between the one or more relay station transceivers and the one more mobile transceivers.

9. The apparatus of claim 1, wherein the central unit comprises a plurality of antennas and wherein the one or more relay station transceivers comprise a plurality of antennas, and wherein the information related to the second radio channel comprises information related to an estimated Multiple-Input-Multiple-Output radio channel between the central unit and the one or more relay station transceivers.

10. The apparatus of claim 1, wherein the information related to the first radio channel or the effective access channel comprises information related to an access radio channel matrix and wherein the information related to the second radio channel comprises information related to a backhaul channel matrix, wherein the information related to the precoding comprises information related to a backhaul precoding matrix and information related to a modified access precoding matrix.

11. The apparatus of claim 10, wherein the control module is further configured to apply the backhaul precoding matrix before backhaul transmission and wherein the control module is configured to apply the modified access precoding matrix before applying the backhaul precoding matrix.

12. The apparatus of claim 1, wherein the precoding is applied at the central unit of the mobile communication system.

13. A central unit of a mobile communication system comprising the apparatus of claim 1.

14. A method for determining information related to precoding in a mobile communication system, the mobile communication system comprising one or more relay station transceivers being configured to provide wireless services to one or more mobile transceivers of the mobile communication system via a first radio channel, the one or more relay station transceivers being configured to use wireless backhaul communication to communicate with a central unit of the mobile communication system via a second radio channel, the method comprising:
    obtaining information related to the first radio channel or an effective access channel;
    obtaining information related to the second radio channel; and
    determining the information related to the precoding based on the information related to the first radio channel or the effective access channel, and based on the information related to the second radio channel, wherein the information related to the first radio channel and the information related to the second radio channel is estimated together as an estimated effective access channel, comprising the first radio channel, the second radio channel and backhaul precoding at the one or more mobile transceivers.

15. A computer program embodied on a non-transitory computer-readable medium, said program having a program code for performing the method of claim 14, when the computer program is executed on a computer, a processor, or a programmable hardware component.

16. An apparatus, comprising:
    at least one processor; and
    at least one memory including computer program code;
    the at least one memory and the computer program code being configured to, with the at least one processor, cause the apparatus at least to perform:
    obtaining information related to a first radio channel or an effective access channel;
    obtaining information related to a second radio channel; and
    determining information related to precoding in a mobile communication system based on the information related to the first radio channel or the effective access channel and the information related to the second radio channel, wherein the information related to the first radio channel and the information related to the second radio channel is estimated together as an estimated effective access channel, comprising the first radio channel, the second radio channel, and backhaul precoding at one or more mobile transceivers, and
    wherein the mobile communication system comprises one or more relay station transceivers being configured to provide wireless services to one or more mobile transceivers of the mobile communication system via the first radio channel, and wherein the one or more relay station transceivers are configured to use wireless backhaul communication to communicate with a central unit of the mobile communication system via the second radio channel.

17. The apparatus of claim 16, wherein the information related to the second radio channel is estimated at the one or more relay station transceivers.

18. The apparatus of claim 16, wherein the information related to the first radio channel is estimated at the one or more mobile transceivers, or wherein the information related to the second radio channel is estimated at the one or more relay station transceivers.

19. The apparatus of claim 16, wherein the mobile communication system comprises two or more relay station transceivers and wherein the information related to the precoding comprises information related to a cooperative multipoint transmission from the two or more relay station transceivers to the one or more mobile transceivers.

20. The apparatus of claim 19, wherein the information related to the precoding comprises beamforming information related to the second radio channel.

* * * * *